E. J. RUCKSTUHL.
CANE JUICE SEPARATOR.
APPLICATION FILED JUNE 21, 1912.
1,060,498.
Patented Apr. 29, 1913.
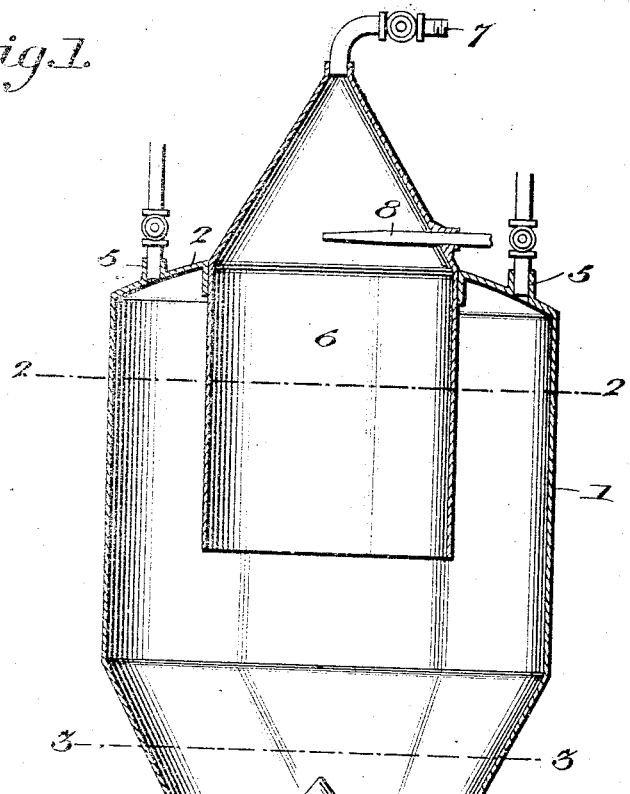
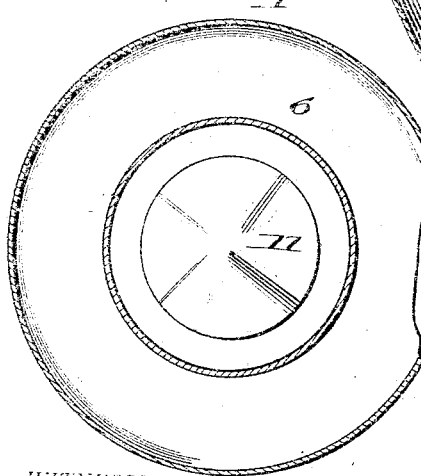
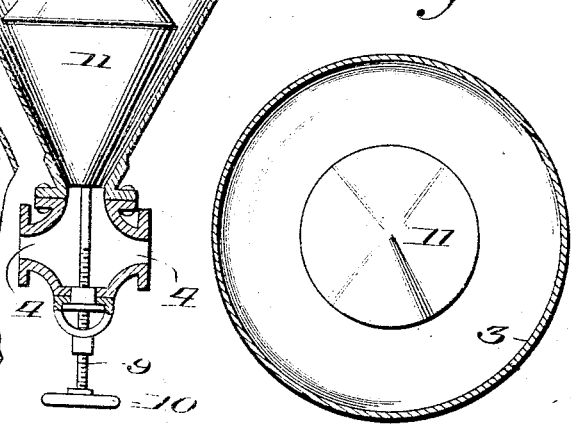
WITNESSES
Philip E. Barnes
E. J. Sheehy
INVENTOR
Edward J. Ruckstuhl
by James Sheehy & Co., Attorneys

UNITED STATES PATENT OFFICE.

EDWARD J. RUCKSTUHL, OF LEVERT, LOUISIANA.

CANE-JUICE SEPARATOR.

1,060,498.

Specification of Letters Patent.

Patented Apr. 29, 1913.

Application filed June 21, 1912. Serial No. 705,078.

*To all whom it may concern:*

Be it known that I, EDWARD J. RUCK-STUHL, citizen of the United States, residing at Levert, in the parish of St. Martin and State of Louisiana, have invented new and useful Improvements in Apparatus for Clarifying or Defecating Saccharine Liquids, of which the following is a specification.

My present invention pertains to apparatus for clarifying or defecating saccharine liquids; and it consists in the simple and efficient apparatus, hereinafter described and claimed, for continuously separating fiber and other light substance, as well as heavy foreign substance from saccharine liquids.

In the drawings accompanying and forming part of this specification: Figure 1 is a vertical diametrical section of the apparatus constituting the best practical embodiment of my invention that I have as yet devised. Fig. 2 is a horizontal section taken in the plane indicated by the line 2—2 of Fig. 1, looking downward. Fig. 3 is a horizontal section taken in the plane indicated by the line 3—3, looking downward.

Similar numerals of reference designate corresponding parts in all of the views of the drawings.

The casing 1 of my novel device is cylindrical in form, and is preferably made of sheet-metal. The said casing is provided at its upper end with an annular inwardly directed flange 2, and at its lower end has a depending and downwardly tapered portion 3, which carries at its lower end one or more, preferably two, discharge passages 4; the said discharge passages being preferably of cast-metal and fixed in any approved manner on the lower end of the casing portion 3. The flange 2 of the casing is provided with a plurality of valved outlets 5.

Suitably fixed within and to the flange 2 of the casing is a collecting member 6 which comprises a portion depending from the flange 2, and of even diameter throughout and open at its lower end, and a portion that extends upward from said flange and is tapered toward its upper end. At its said upper end the tapered portion of the collecting member 6 is provided with a discharge conduit 7 which is preferably, though not necessarily, valved, so that the volume of substance passing therethrough can be regulated as occasion demands.

Extending inward through the wall of the upper tapered portion of the collecting member 6 is a pipe 8, the outer end of which is designed to be connected with means (not shown), for supplying to the apparatus saccharine liquids in a heated state. The inner end of the pipe 8 is preferably, though not necessarily, tapered or reduced as shown, in order to form a nozzle calculated to better spread the saccharine liquids in the tapered or cone-shaped portion of the collector.

Bearing in the central lower portion of the casting containing the discharge passages 4 is a stem 9 having a handle 10 at its lower end, and fixed on the upper end of the said stem 9 is a distributing member 11, which is of double cone-shape, or in other words is tapered in opposite directions from its horizontal median line to points at its ends.

The collecting member 6 and the distributing member 11 are preferably, though not necessarily, made of sheet-metal.

In the practical operation of my novel apparatus, saccharine liquids in a heated state are supplied to the pipe 8, and when desired the supply to the said pipe 8 can be regulated by a valve, not shown. The pipe 8 serves to spread the heated substance in the collecting member 6 with the result that the substance will give off fiber and other particles as well as air. The fiber and other light particles which float will pass off through the outlet 7, while the remainder of the saccharine substance will pass down through the collecting member 6 and out of the lower and open end thereof. The clear liquid will pass up through the annular space between the lower portion of the member 6 and the casing 1, and will pass out through the outlets 5 from which it can be piped to any height, or if desired the valves complementary to the outlets 5 can be closed to a sufficient extent to provide a continuous discharge through the outlet 7.

The double cone distributing member 11 can be adjusted through the medium of the stem 9, as occasion demands; and it has for its function to divide the heavy precipitated substance and afford a large amount of inclined surface so as to enable the precipitated substance to freely discharge without the assistance of agitating means. From this it follows that the distributing member contributes materially to the adaptability of the apparatus to operate continuously. It will also be noticed that the distributing member in combination with the lower tapered portion of the casing will not permit the heavy substance to discharge in a large volume. It will also be noticed that the lower portion of the member 11 is so tapered that the space between the said lower portion and the lower portion of the casing is tapered downward, this in order to accelerate the free passage of the precipitated substance between the distributing member and the lower portion of the casing. The saccharine liquid supplied to the pipe 8 is heated to a temperature of about 200 degrees Fahrenheit.

Having described my invention, what I claim and desire to secure by Letters-Patent, is:

1. In an apparatus for clarifying or defecating saccharine liquids, the combination with a casing having a discharge and also having an inwardly directed annular flange located above said discharge and a discharge orifice in said flange, of a collecting member arranged within and fixed to the said flange of the casing and extending below the flange and open at its lower end and having a portion extending upward from the flange and provided with a discharge orifice, and means for discharging saccharine liquid within the upper portion of the collecting member.

2. In an apparatus for clarifying or defecating saccharine liquids, the combination with a casing having a discharge at its lower end and also having an inwardly directed annular flange at its upper end and a discharge orifice in said flange, of a collecting member arranged within and fixed to the said flange of the casing and extending below the flange and open at its lower end and having an upwardly tapered portion extending upward from the flange and provided with a discharge orifice, and means for discharging saccharine liquid within the upper portion of the collecting member.

EDWARD J. RUCKSTUHL.

Witnesses:
Lucien L. Jarreau,
Jos. C. Fryon.